(12) United States Patent
Hafner

(10) Patent No.: US 11,643,812 B2
(45) Date of Patent: May 9, 2023

(54) DEVICE FOR STORAGE AND USE OF WALL ELEMENTS AND METHOD FOR ROOM DIVISION

(71) Applicant: Operations Support GmbH, Muttenz (CH)

(72) Inventor: Oliver Hafner, Muttenz (CH)

(73) Assignee: OPERATIONS SUPPORT GMBH, Muttenz (CH)

( * ) Notice: Subject to any disclaimer, the term of this patent is extended or adjusted under 35 U.S.C. 154(b) by 382 days.

(21) Appl. No.: 16/826,991

(22) Filed: Mar. 23, 2020

(65) Prior Publication Data
US 2020/0362559 A1    Nov. 19, 2020

(30) Foreign Application Priority Data

May 17, 2019    (DE) .................... DE102019113088.3
May 17, 2019    (DE) .................... DE202019105037.3

(51) Int. Cl.
*E04B 2/74* (2006.01)
*B65G 1/10* (2006.01)

(52) U.S. Cl.
CPC ............. *E04B 2/7405* (2013.01); *B65G 1/10* (2013.01); *E04B 2002/7468* (2013.01); *E04B 2002/7479* (2013.01)

(58) Field of Classification Search
CPC ........... E04B 2/7405; E04B 2002/7468; E04B 2002/7479; E04B 2002/7483; B65G 1/10; A47F 7/0042; A47F 7/30; A47F 7/0014; A47F 7/14; A47F 7/16; E06B 3/48; A47B 46/005; A47B 83/045; A47B 83/001; A47B 2200/12; A47B 2083/005
See application file for complete search history.

(56) References Cited

U.S. PATENT DOCUMENTS

| | | | | |
|---|---|---|---|---|
| 254,836 | A * | 3/1882 | Nauerth ................ | A47F 7/148 211/184 |
| 475,948 | A * | 5/1892 | Pease .................... | A47F 7/0042 211/41.16 |
| 1,712,168 | A * | 5/1929 | Rand, Jr. ............... | B42F 17/02 220/535 |
| 1,817,062 | A * | 8/1931 | Byrnes .................. | A47F 7/14 312/216 |
| 2,819,546 | A * | 1/1958 | Repholz ................ | A47F 7/14 40/536 |

(Continued)

FOREIGN PATENT DOCUMENTS

CH    647684    2/1985
DE    4243301    7/1993
(Continued)

*Primary Examiner* — Ko H Chan
(74) *Attorney, Agent, or Firm* — Simpson & Simpson, PLLC

(57) ABSTRACT

A device (1) for storage and use of wall elements (2) is disclosed. The device (1) comprises a receptacle (4) for the plurality of wall elements (2). The receptacle (4) can comprise at least one construction element (200) which holds the bottom (6) and the ceiling (7). According to an embodiment, the construction element (200) comprises two side walls. The side walls (5) connect the bottom (6) and the ceiling (7) of the receptacle (4). A locking mechanism (10) ensures that the wall elements (2) in the receptacle (4) cannot be removed in an unauthorized manner.

21 Claims, 14 Drawing Sheets

(56) References Cited

U.S. PATENT DOCUMENTS

| | | | | |
|---|---|---|---|---|
| 3,172,711 | A * | 3/1965 | Gillotte | A47B 63/00 312/351 |
| 3,349,924 | A * | 10/1967 | Maurer | A47F 7/0014 211/189 |
| 4,899,880 | A * | 2/1990 | Carter | B65D 85/48 428/173 |
| 4,930,634 | A * | 6/1990 | Williams | H01L 21/67343 206/454 |
| 5,452,811 | A * | 9/1995 | Taravella | A47F 5/137 211/186 |
| 5,560,507 | A * | 10/1996 | Arpin | B65D 85/48 220/1.5 |
| 5,803,562 | A * | 9/1998 | Jacobs | A47B 21/00 312/315 |
| 5,815,903 | A * | 10/1998 | Foster | B42F 15/04 29/401.1 |
| 6,202,884 | B1 * | 3/2001 | Verkerke | B65D 81/05 206/583 |
| 6,484,890 | B1 * | 11/2002 | Miller | A47F 7/163 211/162 |
| 6,540,096 | B1 * | 4/2003 | Bazany | B65D 1/225 206/583 |
| 9,527,613 | B2 * | 12/2016 | Bazany | B65D 85/68 |
| 2008/0072499 | A1 * | 3/2008 | Sibbett | A47F 7/0042 49/374 |
| 2013/0255895 | A1 * | 10/2013 | Toledo | A47H 99/00 160/382 |
| 2013/0284686 | A1 * | 10/2013 | Robbins, III | A47F 7/0042 211/175 |
| 2014/0272918 | A1 * | 9/2014 | Marshall | A47B 97/001 434/421 |
| 2017/0007018 | A1 * | 1/2017 | Mayer | A47B 83/001 |
| 2018/0289154 | A1 | 10/2018 | FitzSimons et al. | |
| 2021/0340807 | A1 * | 11/2021 | Pelger | A47B 97/00 |
| 2022/0061521 | A1 * | 3/2022 | Schwartz | A47B 41/06 |

FOREIGN PATENT DOCUMENTS

| | | |
|---|---|---|
| DE | 102004040604 | 2/2006 |
| DE | 102006020685 | 8/2007 |
| DE | 202012101930 | 8/2012 |
| DE | 102014011028 | 1/2015 |
| DE | 202018103900 | 10/2018 |
| JP | H11128034 | 5/1999 |

* cited by examiner

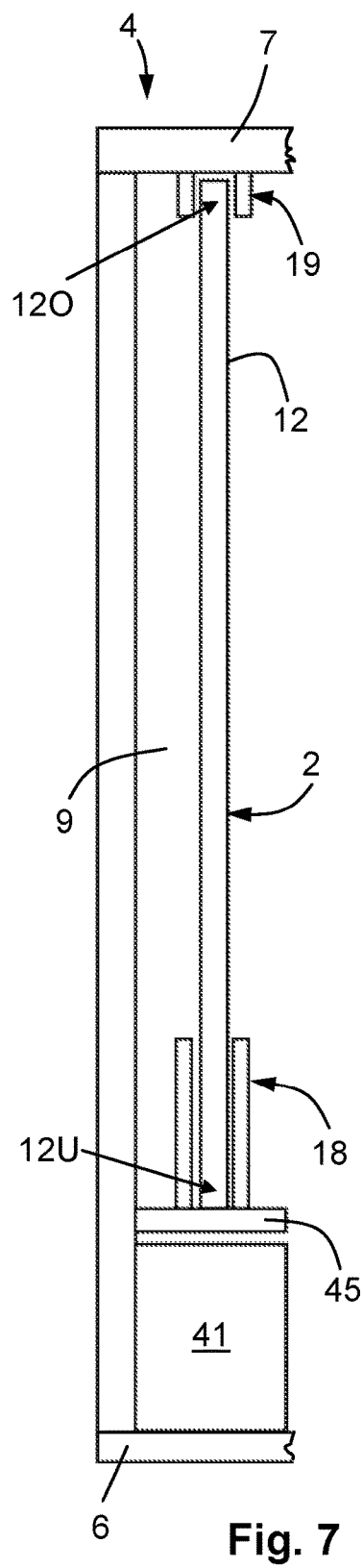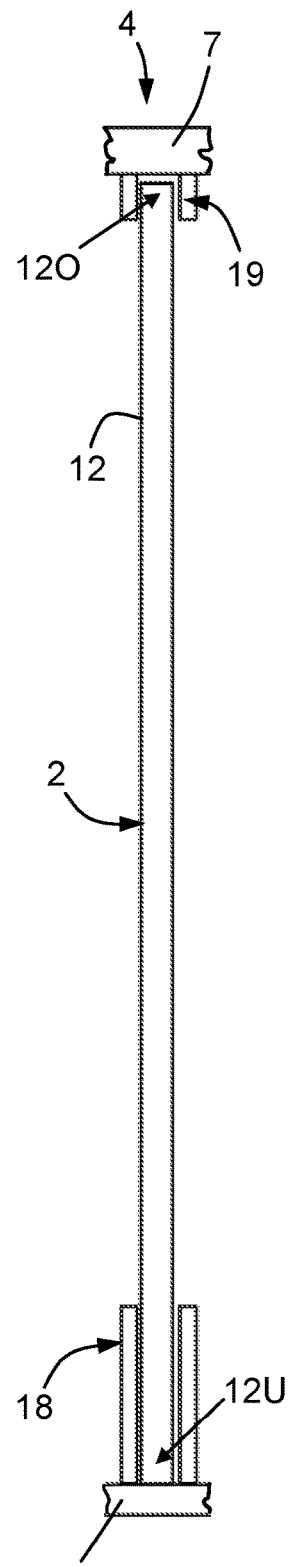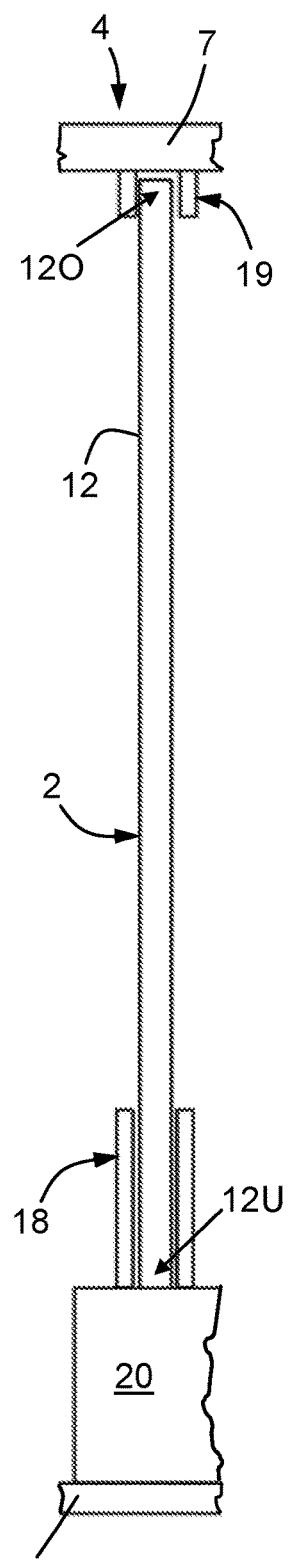

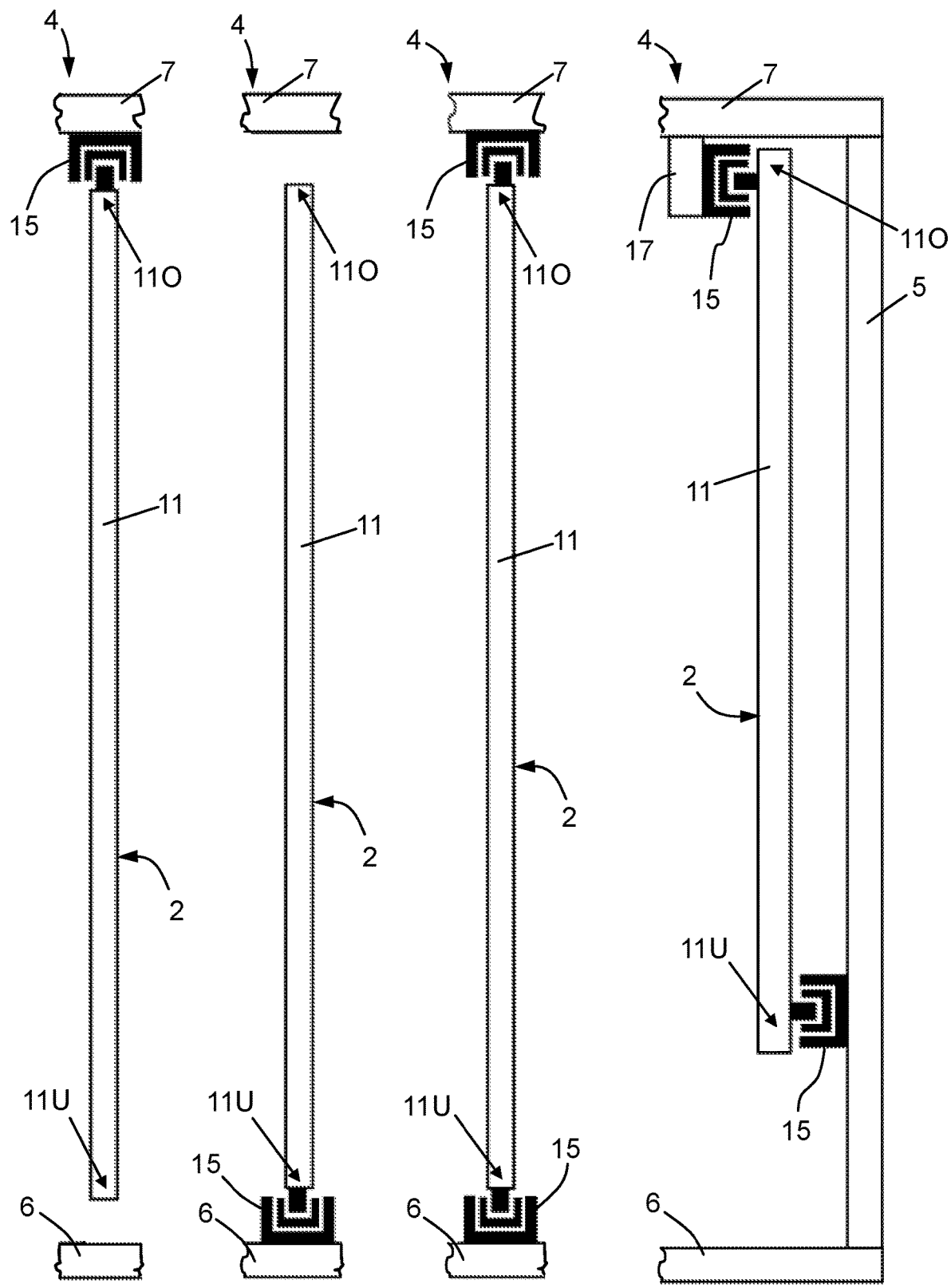

DEVICE FOR STORAGE AND USE OF WALL ELEMENTS AND METHOD FOR ROOM DIVISION

CROSS-REFERENCE TO RELATED APPLICATIONS

This application claims the benefit under 35 U.S.C. § 119 of German Application DE 10 2019 113 088.3, filed May 17, 2019, and German Utility Model Application DE 20 2019 105 037.3, filed May 17, 2019, which applications are incorporated herein by reference in their entireties.

FIELD

The invention relates to a device for storage and use of wall elements.

Furthermore, the invention relates to a method for space or room division.

BACKGROUND

German Patent Application No. DE 42 43 301 A1 discloses a roller-based container for storing and transporting exhibition stand components in changeable, different compartments. The individual compartments are arranged side by side, in front of and/or one above the other and individually freely accessible from openings on a narrow and a broad side of the container. There is no provision for securing the exhibition components in the container.

A system for creating a flexible workspace is disclosed in German Patent Application No. DE 10 2006 020 685 A1. The system comprises at least two support elements for tabletops which differ in terms of their surface and/or their material, wherein the tabletops are identical in at least one base area. Furthermore, the system comprises at least one storage device, in particular, a cupboard, a shelf and/or a trolley, with at least one fastening device complementary to the base area.

German Patent Application No. DE 10 2014 011 028 A1 relates to a mobile presentation wall which consists of at least one wall element. The presentation wall is provided with at least two movement devices arranged on the underside. The wall element has a curvature in the width direction and can be connected in a form-fitting and/or force-fitting manner in one or both side regions to at least one second wall element.

Japanese Patent No. JP H11-128034 A discloses a presentation device. The exhibition elements are rotatably connected to joints on the left and right sides of a main body of the presentation device. The main body is provided with a writing board on its upper front surface, and a scroll screen can also be pulled out through a slot. It is not intended to accommodate a plurality of panels in the main body.

German utility model DE 20 2018 103 900 U1 discloses a combinable mobile wall element which comprises a wall filling and frame elements surrounding the wall filling. The individual wall elements can be connected to one another by means of fastening grooves in the frame elements.

Swiss Patent No. CH 647 684 A5 discloses a wall element with a foot element anchored thereto, which is configured as a carriage. The foot element can be inserted into the foot element of another wall element. Together, the wall elements can be moved to other rooms. Storage of the wall elements without the risk of damage or vandalism is not intended.

So far, flipchart sheets are often used, which are removed from the project room after the meeting and brought back to the next meeting. This is very cumbersome because the sheets crumple, nothing can be repaired and additional documents (pictures and drawings) cannot be attached.

SUMMARY

The object of the invention is therefore to provide a device for storage and use of wall elements, in which the wall elements, in particular the wall elements configured as information carriers, can be securely stored against unauthorized access.

This object is achieved by a device for storage and use of wall elements. The device comprises a receptacle for a plurality of wall elements. According to an embodiment, the receptacle comprises at least one construction element. The construction element can be a side wall that connects the bottom and the ceiling of the receptacle. A locking mechanism is also provided, which secures the wall elements in the receptacle against unauthorized removal. Preferably, two side walls are provided which connect the bottom and the ceiling to one another and thus define the receptacle.

It is a further object of the invention to provide a method for dividing a space into at least one subspace, which allows an easy, simple and variable space division.

The above object is achieved by a method for delimiting at least one sub-space from a larger space comprising the steps of:

placing a device in the space to be divided, wherein the device carries a plurality of stored wall elements;

unlocking a locking mechanism of a receptacle of the device to unlock the plurality of wall elements in the receptacle; and, forming the sub-space by the pulling out as pull-out wall elements configured wall elements from the receptacle or removing removable wall elements from the receptacle or pivoting pivotable wall elements attached after pull-out to the receptacle.

According to a further embodiment of the invention, a plurality of wall elements can be stored in one receptacle. The receptacle has at least one construction element that connects and holds a bottom and a ceiling of the receptacle. A locking mechanism interacts with the at least one construction element and secures the wall elements in the receptacle against unauthorized removal. In this embodiment, the construction element is at least one column that connects and holds the bottom and the ceiling. Furthermore, this embodiment of the receptacle defines two opposite sides, which are at least partially covered by mechanically and/or magnetically attachable wall elements.

The advantage of the invention is that meeting and project rooms (space) can be delimited as required. The wall elements can at the same time also be writable or configured as a medium for content, which results, for example, from meetings, project work, etc. With the invention, this content or information can be stored safely and inaccessibly, so that the documents developed are not generally accessible.

The wall elements according to the invention can be configured as pull-out wall elements, as removable wall elements, or as pivotable wall elements.

In the open state of the locking mechanism, the pull-out wall elements can be pulled-out in the opposite direction and parallel to the side walls of the receptacle. In the pulled-out state, the pull-out wall elements can be fixed to the receptacle. Likewise, the pivotable wall elements can be pivoted about a vertical axis of rotation at the receptacle.

According to the invention, the locking mechanism can be configured in different ways. For example, the locking mechanism is a rod which is inserted laterally through a hole in the side wall of the receptacle of the device and in aligned holes of the wall elements when the wall elements are located in the receptacle. The rod has a locking mechanism so that the wall elements cannot be removed or pivoted by an unauthorized person.

According to another embodiment of the invention, the rod can be guided by holders at the receptacle and by holders at the movable wall elements. For example, the rod is secured with a lock against removal or movement.

A further possibility for securing the wall elements is that the wall elements are secured individually or with a central lock by means of pushable or rotatable pins or hooks which engage into an opening or eyelet.

Another possibility of securing the wall elements in the receptacle is that a pivotable latch, a pivotable bolt or a pivotable door is attached laterally of the receptacle. The pivotable latch, pivotable bolt or pivotable door can be used to close the rear and front opening of the receptacle. The pivotable latch, pivotable bolt or pivotable door may comprise a handle with which the device can be moved (pulled or pushed).

The possibilities described above for closing the receptacle with the wall elements arranged therein should not be construed as a limitation of the invention. It is obvious to a person skilled in the art that there are innumerable configurations with which the receptacle can be locked with the wall elements arranged therein.

The wall elements, which are accommodated in the receptacle, are configured in the form of the pull-out wall elements and/or as the removable wall elements and/or as the pivotable wall elements. In an embodiment, the pull-out wall elements are configured such that they are still held in the receptacle in the pulled-out state. For pulling-out the pull-out wall elements, each pull-out wall element is held at least at an upper end and/or a lower end by means of at least one pull-out element extending in a longitudinal direction of the receptacle. In embodiments, the at least one pull-out element extending in the longitudinal direction is defined as a sliding guide or a roller-bearing or ball-bearing guide.

According to an embodiment, the removable wall elements can be guided in a hanging manner at an upper end at a linear guide extending in the longitudinal direction of the receptacle. The hanging-guided and removable wall elements can be guided in a lateral guide at a lower end of the wall elements.

The pivotable wall elements can be articulated (hinged) at the end faces of the receptacle by means of hinges. In the state of storage or retention of the pivotable wall elements, they rest at one of the side walls of the receptacle and can be locked with the locking mechanism against unauthorized use. When the locking mechanism is open, the pivotable wall elements can be pivoted about a vertical axis and brought into a position of use.

According to another embodiment, the removable wall elements can be guided at a lower end standing in a lateral guide in the longitudinal direction of the receptacle and at an upper end freely guided in a lateral guide at the ceiling of the receptacle.

According to an embodiment of the invention, the lateral guide for the lower end of the removable wall element can be provided directly on the bottom of the receptacle. Another possibility is that the lateral guide is provided on a pedestal above the bottom of the receptacle. Another possibility is that the lateral guide is provided on a pedestal standing at the bottom of the receptacle.

When the locking mechanism is open, the removable wall elements can be removed from the receptacle parallel to the side walls of the receptacle. According to an embodiment, a wall element can be held in each case in a pedestal that can be removed from the receptacle. The number of pedestals positioned and removable at the bottom of the receptacle may correspond to the number of removable wall elements provided in the receptacle.

Each of the pedestals has an installation surface. Above the installation surface, the pedestal carries a lateral guide which comprises at least two spaced-apart guide elements, the distance of which is greater than a thickness of the wall element.

To fix the position of the wall element, at least one magnetizable element or at least one magnet can be attached in the pedestal in the lateral guide. The magnetizable element or the at least one magnet cooperates with at least one corresponding magnetizable element or a magnet on or at a lower edge of the wall element.

Due to the multiple pedestals in the receptacle, the loose wall elements can be set up freely in any space on the bottom or on tables after removal from the interior of the receptacle. The pedestals can be set up in any space or room. For example, the removable wall elements have magnets or magnetizable elements embedded on the lower edge, which magnets or magnetizable elements additionally fix the wall elements in the pedestals.

The wall elements can also be hung or leaned against a vertical surface. The removable wall elements can also be held on an outer surface of the side walls of the receptacle. The mounting of the removable wall elements on the outer surface of the side walls of the receptacle can be of mechanical and/or magnetic nature. The wall elements can thus be placed freely in the room on the pedestals outside the receptacle. The mechanical fixation of the wall elements on the side walls of the receptacle can be carried out, for example, by means of a bar mounted on the side wall, into which bar the wall element can be hung. Magnetic fixation of the wall elements on the outer surface of the side walls of the receptacle can be carried out, for example, by means of magnets, which are embedded in the removable wall element. The removable wall element is configured such that the magnets are not visible from the outside. The position of the magnets in the removable wall element is configured in accordance with the position of the magnets or magnetizable elements in the side wall of the receptacle.

At least one surface of the wall elements can be provided with a coating, so that the surface of the wall elements can be written on and wiped off. According to a further embodiment of the invention, an outer surface of the side wall of the receptacle also has a coating that can be written on and wiped off.

At least one surface of the wall elements can be provided with a magnetizable surface, so that magnets adhere to the surface. According to a further embodiment of the invention, an outer surface of the side wall of the receptacle also has a magnetizable surface to which magnets adhere.

According to a further embodiment of the invention, a respective soft mat is mounted on the writable and wipeable surface of the wall elements and/or on the outer surface of the side wall by means of mechanical and/or magnetic fastening means. By means of the soft mats, objects can be attached to the wall elements or the side wall with needles. The soft mats can be attached to the wall elements or the side walls with a clamping device or hooks and eyes. In addition, the magnetic fastening means for the soft mats can be configured as magnetizable metal pieces or magnets, which allow the soft mats to be magnetically attached to the wall elements and the side walls of the receptacle.

In an embodiment, to store the soft mats, at least one compartment is provided in the receptacle, in which the soft mats can be stored.

In an embodiment, a plurality of transport rollers is arranged on the bottom of the receptacle, with which the mobility of the receptacle is facilitated. Likewise, a plurality of stoppers can be provided in, at or on the receptacle, which can be placed on the bottom of the room in order to prevent free rotation of the rotatable wall elements fixedly connected to the receptacle.

The device according to the invention can be used to delimit at least one sub-space in a room. If the device according to the invention is used, for example, in a project work, the developed project statuses have to be recorded during the meeting. At the next meeting, this information is available on the wall elements, which are stored securely and unchangeably in the receptacle, for further elaboration.

According to the invention, the receptacle can be a stationary or mobile receptacle in which one or more writable wall elements can be stored. For example, the wall elements have a special surface coating that allows for wiping off the writing of permanent fiber pens. In addition, a soft mat, such as made of cork, felt, foam etc., can also be temporarily applied to the wall elements. The wall elements can thus be used as a pin board.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 7 shows an embodiment of guide means for a removable wall element in the receptacle of the device;

FIG. 8 shows a further embodiment of guide means for a removable wall element in the receptacle of the device;

FIG. 9 shows yet another embodiment of guide means for a removable wall element in the receptacle of the device;

FIG. 13 shows yet another embodiment of a mounting of a pull-out wall element in the receptacle of the device;

FIG. 14 shows an additional embodiment of a mounting of a pull-out wall element in the receptacle of the device;

FIG. 15 shows a further additional embodiment of a mounting of a pull-out wall element in the receptacle of the device;

FIG. 16 shows yet another additional embodiment of a mounting of a pull-out wall element in the receptacle of the device;

DETAILED DESCRIPTION

At the outset, it should be appreciated that like drawing numbers on different drawing views identify identical, or functionally similar, structural elements. It is to be understood that the claims are not limited to the disclosed aspects. The proportions in the figures do not always correspond to the real proportions, since some shapes are simplified and other shapes are shown enlarged in relation to other elements for better illustration.

Furthermore, it is understood that this disclosure is not limited to the particular methodology, materials and modifications described and as such may, of course, vary. It is also understood that the terminology used herein is for the purpose of describing particular aspects only and is not intended to limit the scope of the claims.

Figure 1:
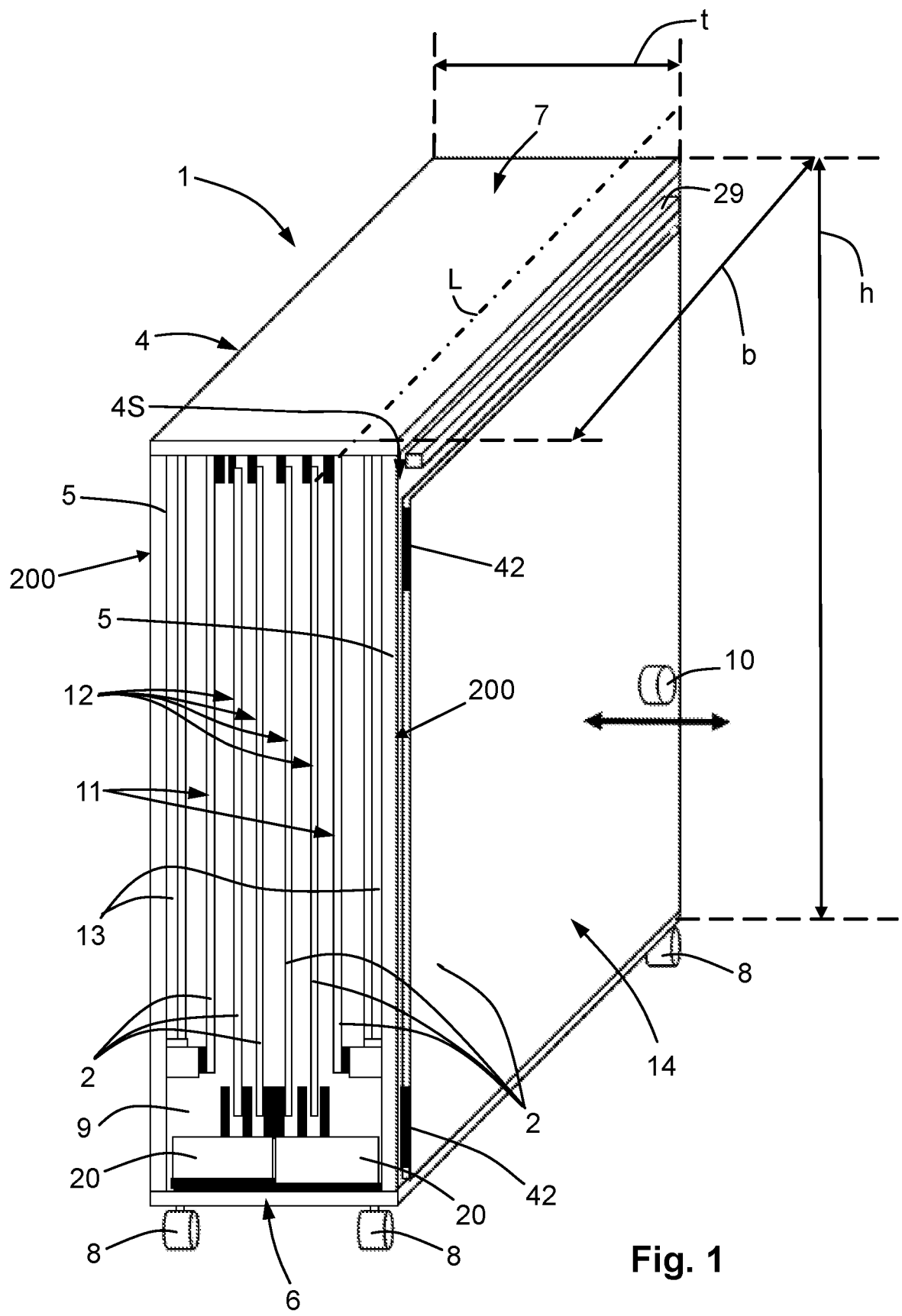
FIG. 1 is a perspective view of an embodiment of the device for storage and use of wall elements according to the invention.
Figure 2:
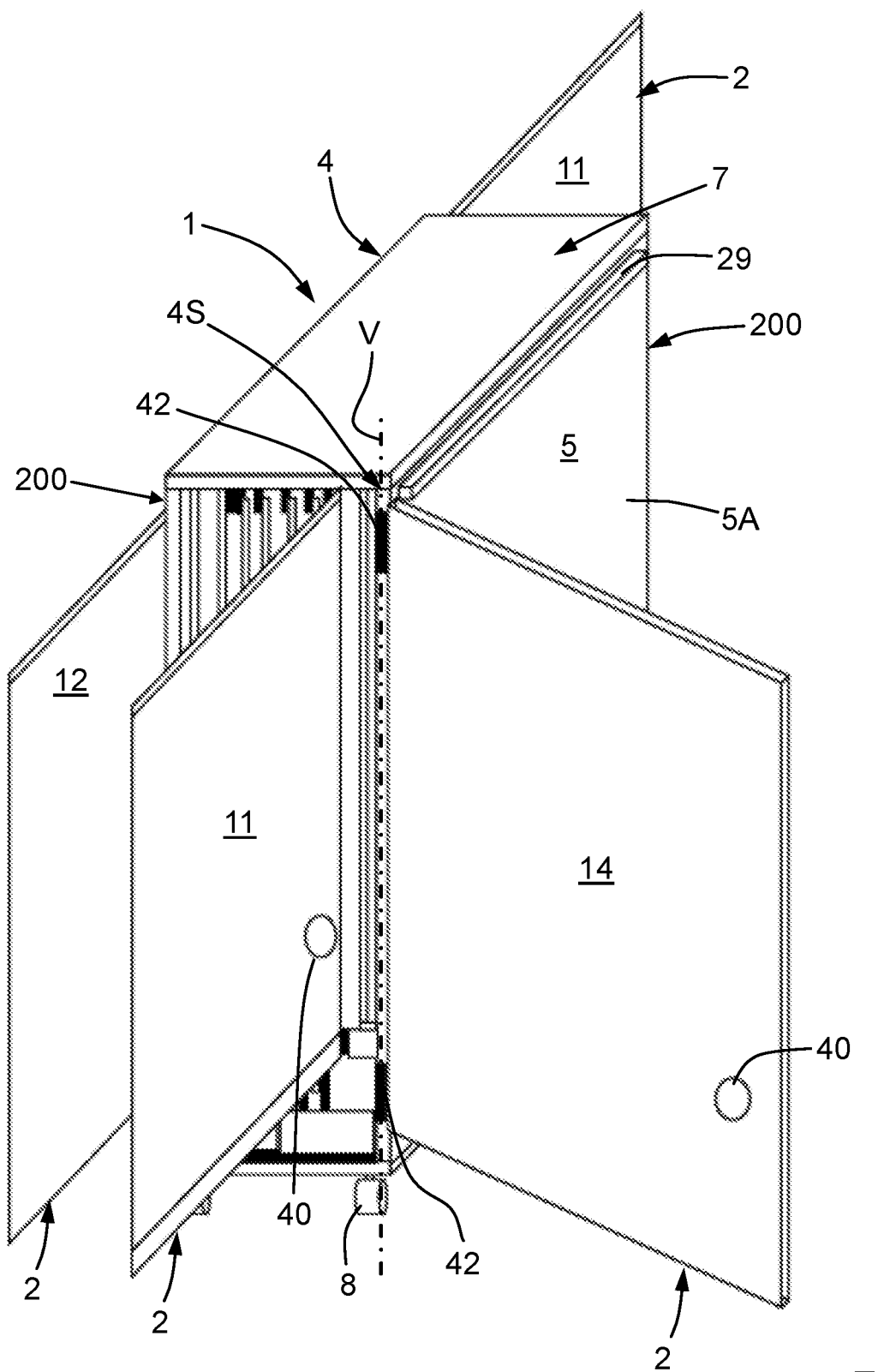
FIG. 2 is a perspective view of the device for storage and use of wall elements, some wall elements being in the use position outside the device.
Figure 3:
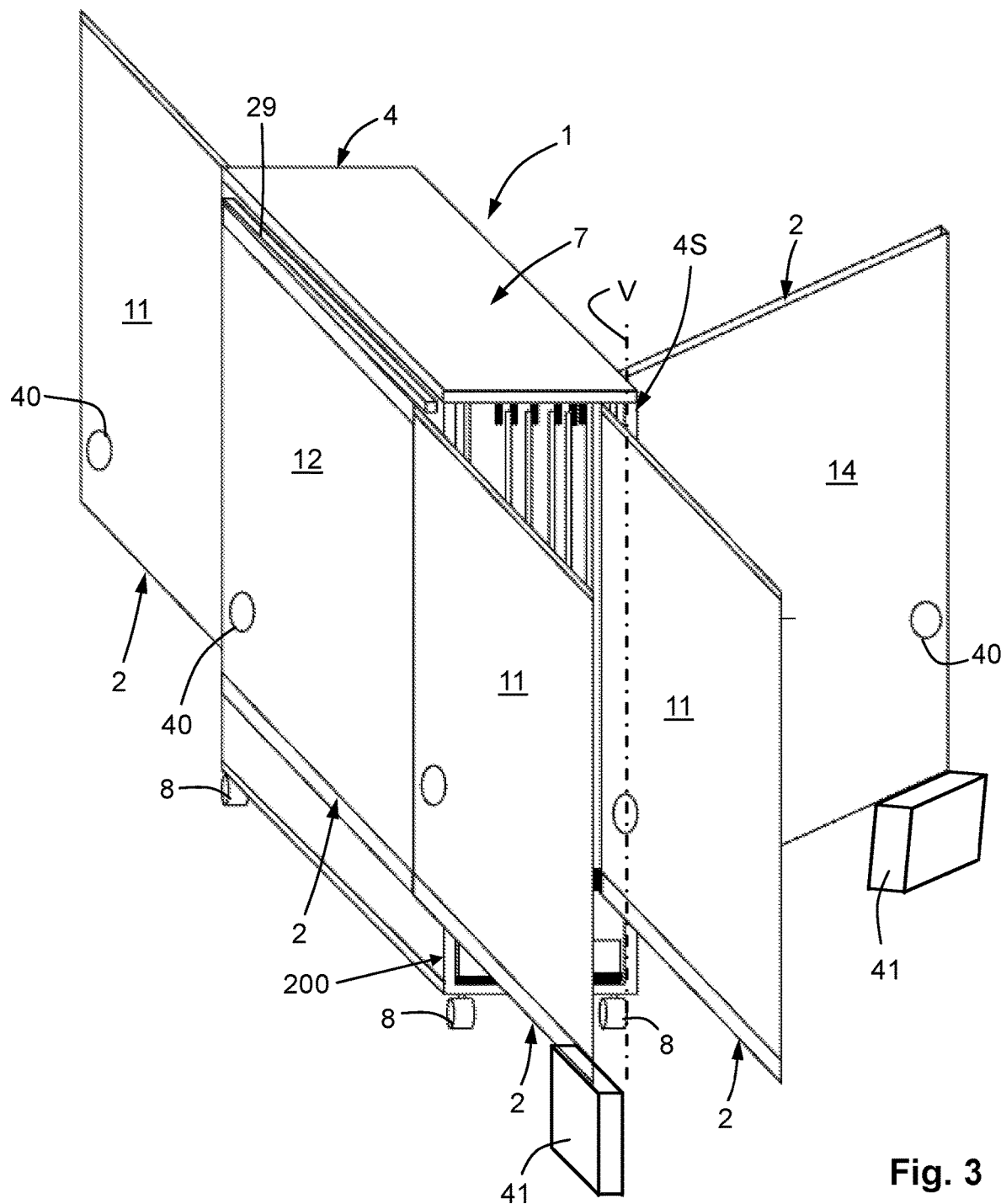
FIG. 3 is another perspective view of the device for storage and use of wall elements of FIG. 2, some wall elements being in the use position outside the device.

Adverting now to the figures, FIG. 1 is a perspective view of an embodiment of the device 1 for storage and use of wall elements 2 according to the invention. Device 1 comprises a receptacle 4 for a plurality of wall elements 2. In this embodiment, a construction element 200 of receptacle 4 is formed by two side walls 5. An embodiment with only one side wall 5 is also possible. Although the following description of FIGS. 1 to 3 is limited to two side walls 5, this should not be construed as a limitation of the invention. Thus, according to the embodiment according to FIG. 1, receptacle 4 consists of two side walls 5, a bottom 6 (base) connecting the side walls 5 and a ceiling 7 connecting the side walls 5. The wall elements 2 are completely accommodated in receptacle 4 for storage. To protect the wall elements 2 against unauthorized access, a locking mechanism 10 is provided which prevents the wall elements 2 from being pulled-out, removed or swung out of receptacle 4 in an unauthorized manner. In the embodiment described here, the locking mechanism 10 is a pin, which engages through openings 40 (not shown here) in the two side walls 5 of receptacle 4 and through corresponding openings 40 (see FIGS. 2 and 3) in the wall elements 2 arranged in the receptacle 4. This configuration of the locking mechanism 10 should not be construed as a limitation of the invention. As described at the beginning, it is within the conventional ability of a person skilled in the art to configure locking mechanism 10 in a wide variety of ways.

In the embodiment of device 1 described here, six wall elements 2 are accommodated within receptacle 4. Of the six wall elements 2, two wall elements 2 are configured as pull-out wall elements 11 and four wall elements 2 are configured as removable wall elements 12. The pull-out wall elements 11 and the removable wall elements 12 can be pulled out of receptacle 4 in a longitudinal direction L when locking mechanism 10 is open.

In addition, at least one pivotable wall element 14 can be provided on side wall 5 on an outer surface 5A (shown in FIG. 2) of receptacle 4. In an embodiment of the invention, a pivotable wall element 14 can be articulated (hinged) at each end face 4S (shown in FIG. 2) of receptacle 4 by means of a hinge 42. In the maximum configuration of device 1, pivotable wall elements 14 are provided at each end face 4S, which can be pivoted about a vertical axis V (see FIG. 2). In the maximum configuration, four pivotable wall elements 14 are thus possible.

Transport rollers 8 can be arranged on bottom 6 of receptacle 4 for easier movement of receptacle 4.

In the embodiment described here, removable pedestals 20 (platforms) are positioned on bottom 6 of receptacle 4. The removable wall elements 12 can be placed in the removable pedestals 20 and held freely in a space 100 (room) (see FIGS. 22 and 23). Since in this embodiment four removable wall elements 12 are provided in receptacle 4, four removable pedestals 20 are consequently provided in receptacle 4. As already mentioned at the beginning, the number of pull-out wall elements 11 and/or removable wall elements 12 provided in receptacle 4 should not be construed as a limitation of the invention. Depending on the customer's wishes, the interior (number of pull-out wall elements 11 and/or removable wall elements 12) and also the exterior (pivotable wall elements 14) of receptacle 4 can be configured.

The receptacle 4 of device 1 has a height h, a width b and a depth t. The possible height h of receptacle 4 is 200 cm. The possible width b of receptacle 4 is 140 cm. The possible depth t of receptacle 4 is 50 cm. The details of height h, width b and depth t listed here should not be construed as a limitation of the invention. Depending on customer requirements, height h, width b and depth t can be configured accordingly.

FIG. 2 and FIG. 3 each show a perspective view of the device 1 for storage and use of wall elements 2, some wall elements 2 being in the use position outside receptacle 4 of device 2. In the use position there are some pull-out wall elements 11, some removable wall elements 12 and the pivotable wall elements 14. Each of the wall elements 2 described in this embodiment has an opening 40. As already mentioned in the description of FIG. 1, the openings 40 of the wall elements 2 are aligned with the openings (not shown) in the side walls 5 so that the locking mechanism 10 can be inserted.

The articulation (hinging) of the at least one pivotable wall element 14 is configured with the hinge 42 in such a way that a pivoting movement about the vertical axis V with a rotation angle of up to 270 degrees is permitted. In the closed state, as shown in FIG. 1, the pivotable wall element 14 is pivoted to the side wall 5 of receptacle 4. In the open state (state of use), the pivotable wall element 14 is pivoted away from the side wall 5 of receptacle 4.

As can be seen from the illustrations in the preceding FIGS. 1 to 3, the pivotable wall elements 14 or the removable wall elements 12 or the pull-out wall elements 11 can be fastened or held on the receptacle 4 on the outer surface 5A of side walls 5 of receptacle 4. The embodiment of the mechanical fixing of the wall elements 2, in particular the removable wall elements 12, can take place on the side walls 5 of receptacle 4 by means of a bar 29 (strip) mounted on the side wall 5. The removable wall element 12 is mounted in the bar 29 and is thus held on the side wall 5 of receptacle 4.

At least one stopper 41 is located in or at receptacle 4, which can be placed, for example, on the floor of space 100 (room) in order to prevent a free pivoting movement of the pivotable wall elements 14 firmly connected to receptacle 4. Likewise, stopper 41 can be connected directly to pivotable wall element 14 or a pull-out wall element 11. Stopper 41 makes sense, because when writing on pivotable wall element 14 or a pull-out wall element 11, this is fixed in its position and thus provides a stable writing surface.

Figure 4:
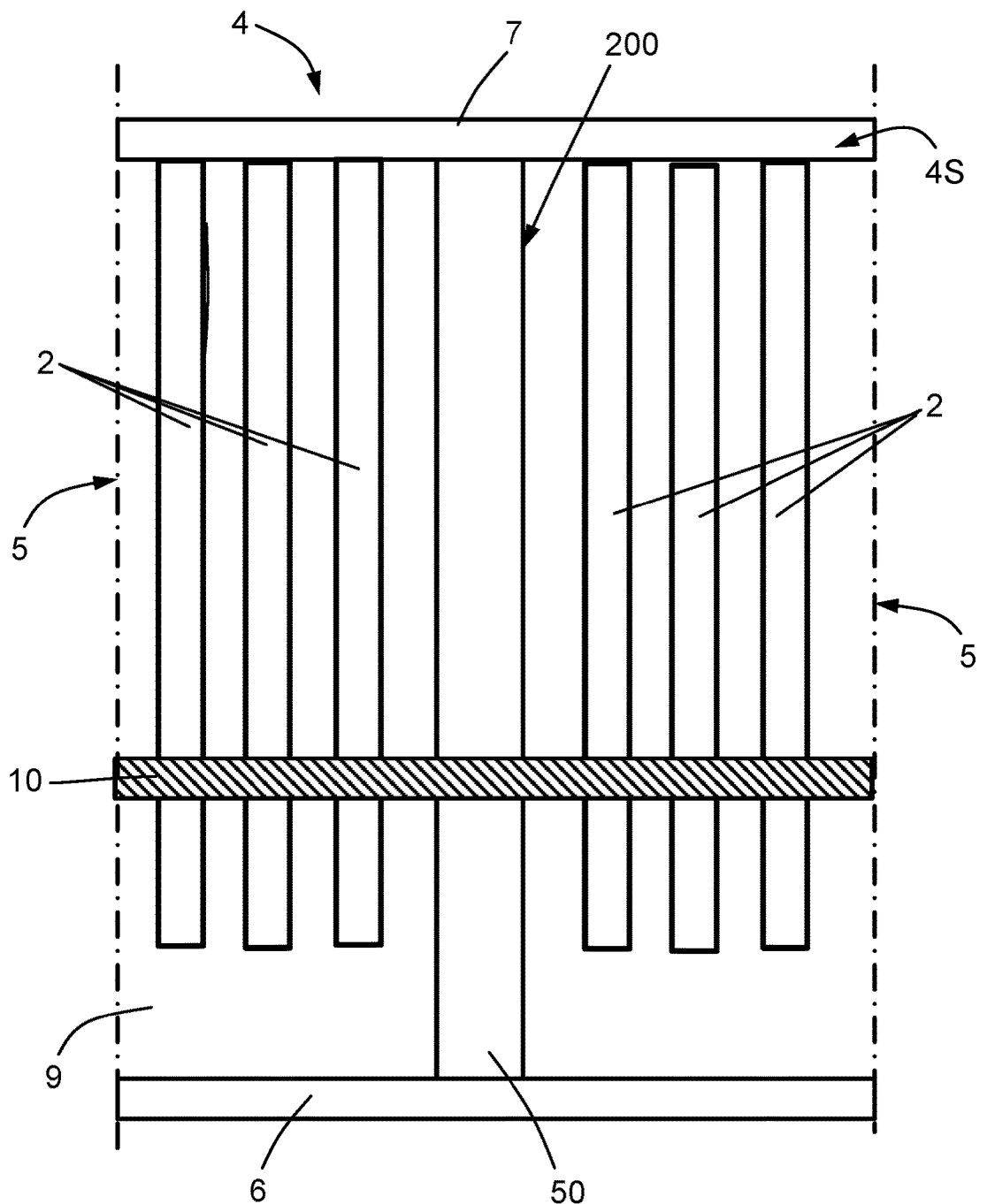
FIG. 4 shows a further embodiment of the receptacle for the wall elements.

FIG. 4 shows a further embodiment of the receptacle 4 according to the invention. At least one construction element 200 is provided which connects bottom 6 to ceiling 7 of receptacle 4 and holds both. According to the embodiment proposed here, construction element 200 is a column or a continuous wall or a partially continuous wall 50. The locking mechanism 10 described in this embodiment can be, for example, a pin which engages through openings 40 (not shown here) in the wall elements 2 arranged in receptacle 4. This embodiment of locking mechanism 10 should not be construed as a limitation of the invention. As described at the beginning, it is within the conventional ability of a person skilled in the art to configure the locking mechanism 10 in a wide variety of ways, so that locking mechanism 10 interacts with construction element 200 in such a way that when locking mechanism 10 is closed, unauthorized removal of wall elements 2 from receptacle 4 is prevented. Ceiling 7 and bottom 6 of receptacle 4 each define two opposite, virtual sides 5, which can be partially closed by wall elements 2, which are mechanically and/or magnetically attached to ceiling 7.

Figure 5:
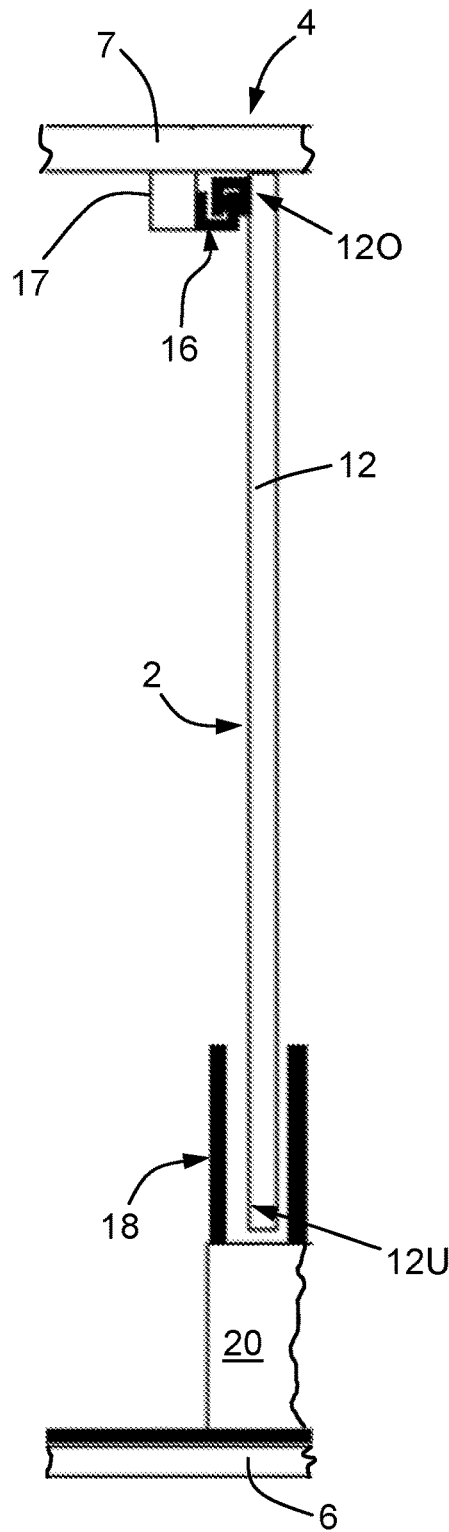
FIG. 5 shows an embodiment of movable fastening means of a removable wall element in the receptacle of the device.
Figure 6:
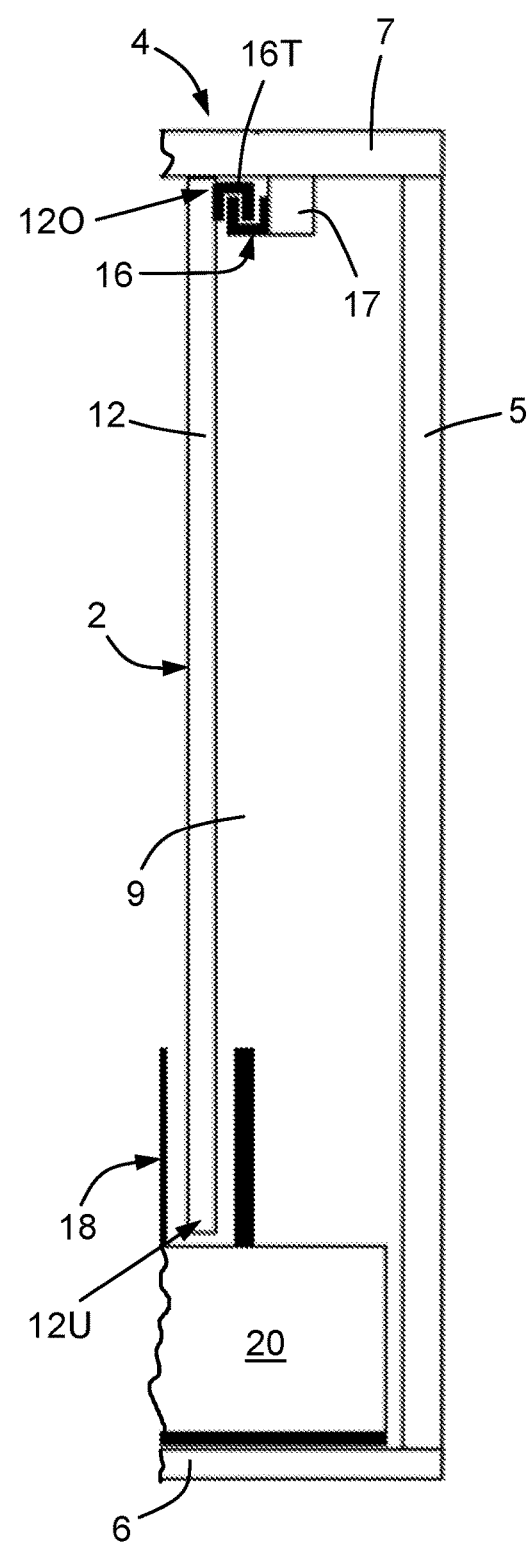
FIG. 6 shows a further embodiment of the movable holder of a removable wall element in the receptacle of the device.
Figure 10:
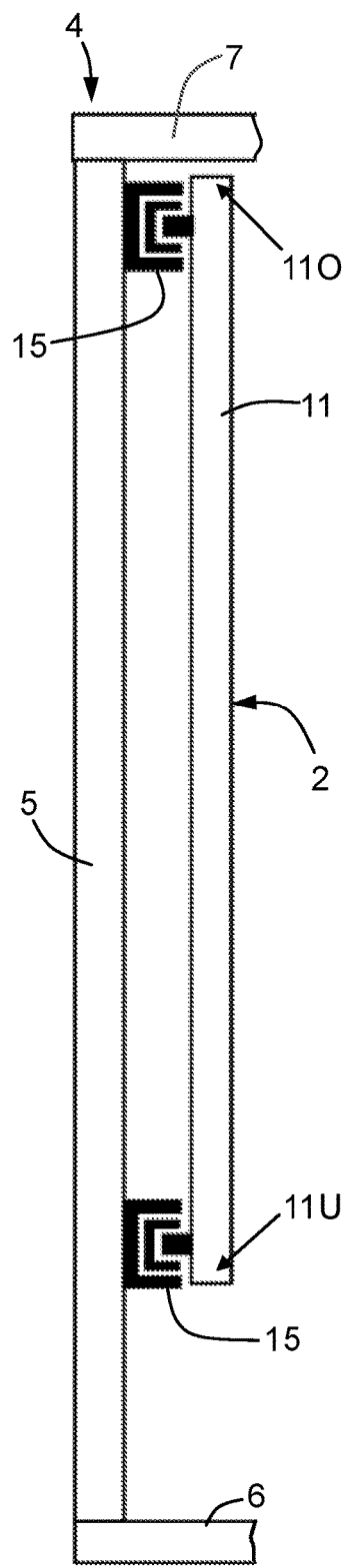
FIG. 10 shows an embodiment of a mounting of a pull-out wall element in the receptacle of the device.

FIGS. 5 and 6 show different embodiments of the hanging fixture of a wall element 2 in receptacle 4 of device 1. Wall element 2 is a removable wall element 12. The removable wall elements 12 are hanging-guided at an upper end 12O on a linear guide 16, which extends in the longitudinal direction L of receptacle 4. A part of linear guide 16 is attached to a holder 17 (bracket) on ceiling 7. Another part of linear guide 16 is attached to the removable wall element 12. The hanging-guided and removable wall elements 12 are guided at a lower end 12U of the wall elements 12 in a lateral guide 18. In the embodiments shown in FIGS. 4 and 5, the lateral guides 18 are each provided on a pedestal 20 which is positioned on the bottom 6 of receptacle 4.

FIGS. 7 to 9 show different embodiments of guide means of a removable wall element 12 in the receptacle 4 of device 1 according to the invention. At a lower end 12U, the removable wall elements 12 are standing in a lateral guide 18 in the longitudinal direction L of receptacle 4. At an upper one end 12O, the removable wall elements 12 are freely guided in a guide element 19 on the ceiling 7 of receptacle 4. In the embodiment shown in FIG. 7, the lateral guide 18 of the removable wall element 12 is provided on a support plate 45 above bottom 6 of receptacle 4. The stoppers 41 or the pedestals 20 can be accommodated in the receptacle 4 in the space between support plate 45 and bottom 6. In the embodiment shown in FIG. 8, the lateral guide 18 is attached directly to the bottom 6 of receptacle 4. Removable wall element 12 thus corresponds approximately to the height h of receptacle 4. In the embodiment shown in FIG. 9, the lateral guide 18 is provided on a pedestal 20 which is positioned in the receptacle 4 on its bottom 6. As already mentioned, the pedestals 20 can be removed from receptacle 4 in order to set up the removable wall elements 12 freely in space 100.

FIGS. 10 to 16 show embodiments of a mounting of a pull-out wall element 11 in the receptacle 4 of device 1, wherein pull-out wall element 11 can be moved with at least one pull-out element 15 in longitudinal direction L of receptacle 4 such that the pull-out wall elements 11 are accessible from both sides. The pull-out elements 15 can be configured as pull-out rails. The pull-out rails can be telescopic pull-out elements. In the embodiment shown in FIG. 10, two pull-out elements 15 are attached to the side wall 5 of receptacle 4. The pull-out elements 15 are arranged in such a way that they are connected to the pull-out wall element 11 in a region of the upper end 11O and in a region of the lower end 11U.

Figure 11:
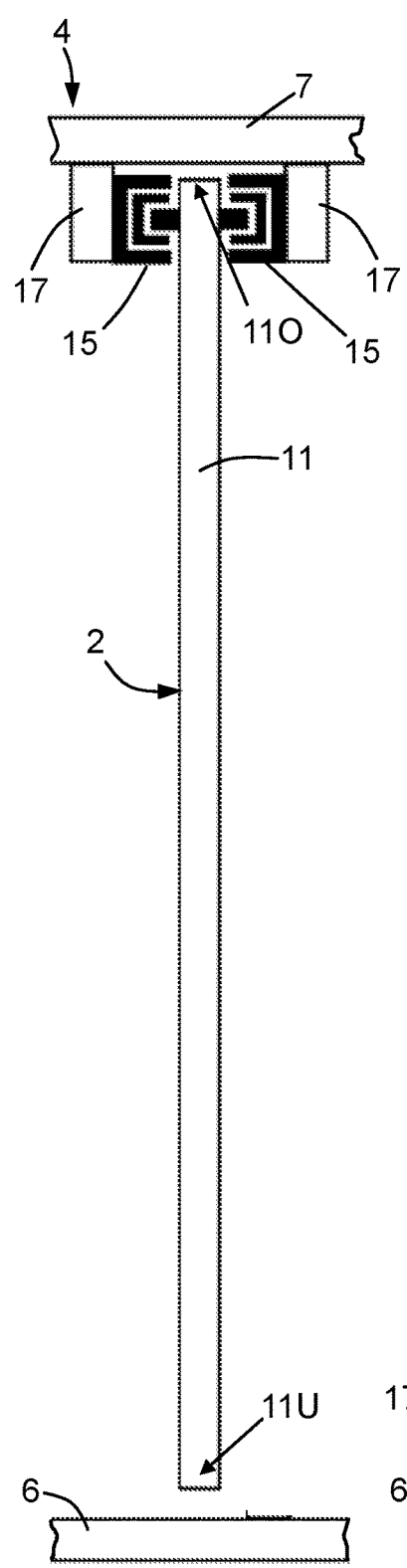
FIG. 11 shows a further embodiment of a mounting of a pull-out wall element in the receptacle of the device.

In the embodiment shown in FIG. 11, pull-out wall element 11 is arranged on ceiling 7 by means of two pull-out elements 15 and hangs from ceiling 7. Lower end 11U is freely movable above bottom 6 of receptacle 4. On the ceiling 7 of receptacle 4, two holders 17 are attached, each of which carries a pull-out element 15. The pull-out elements 15 are arranged opposite to each other and connected to the upper end 11O of pull-out wall element 11.

Figure 12:
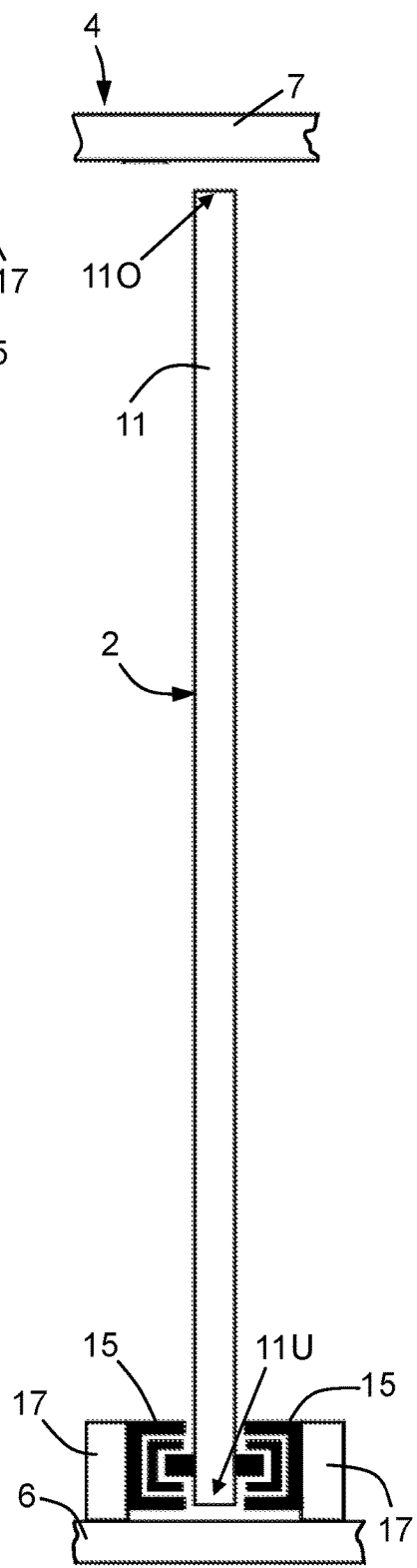
FIG. 12 shows a still further embodiment of a mounting of a pull-out wall element in the receptacle of the device.

In the embodiment shown in FIG. 12, the pull-out wall element 11 is arranged standing on bottom 6 by means of two pull-out elements 15. The upper end 11O is freely movable to the ceiling 7 of receptacle 4. At the bottom 6 of receptacle 4, two holders 17 are attached, each of which carries a pull-out element 15. The pull-out elements 15 are arranged opposite to each other and connected to the lower end 11U of pull-out wall element 11.

In the embodiment shown in FIG. 13, the pull-out wall element 11 is suspended from ceiling 7 by means of a pull-out element 15. The lower end 11U is freely movable above bottom 6 of receptacle 4. The pull-out element 15 is mounted on ceiling 7 and is connected directly to the upper end 11O of pull-out wall element 11.

In the embodiment shown in FIG. 14, the pull-out wall element 11 is held upright on bottom 6 by means of a pull-out element 15. The upper end 11O is freely movable to ceiling 7 of receptacle 4. The pull-out element 15 is mounted on bottom 6 and is connected directly to the lower end 11U of pull-out wall element 11.

In the embodiment shown in FIG. 15, the pull-out wall element 11 is mounted so that it can be pulled out via two pull-out elements 15. One pull-out element 15 is mounted on ceiling 7 of receptacle 4 and another pull-out element 15 is mounted on bottom 6 of receptacle 4. The two pull-out elements 15 are connected directly to the upper end 11O and the lower end 11U of pull-out wall element 11 respectively.

In the embodiment shown in FIG. 16, the pull-out wall element 11 is also mounted so that it can be pulled out via two pull-out elements 15. One pull-out element 15 is held on a holder 17 attached to the ceiling 7 of receptacle 4 and is connected to the pull-out wall element 11 in the region of the upper end 11O. The other pull-out element 15 is connected to the side wall 5 of receptacle 4 and in the region of the lower end 11U to the pull-out wall element 11. The pull-out wall element 11 is thus stably supported between the two pull-out elements 15.

Figure 17:
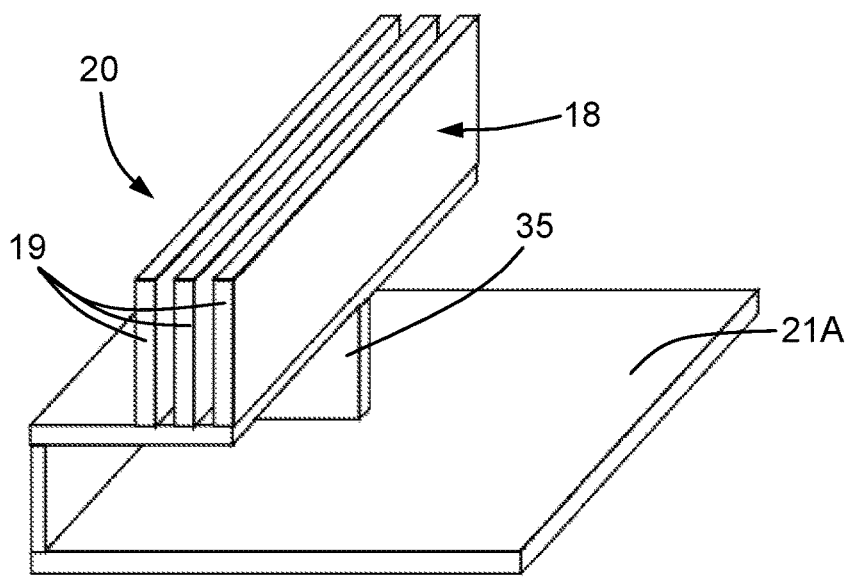
FIG. 17 is a perspective view of an embodiment of a pedestal for holding one of the removable wall elements.
Figure 18:
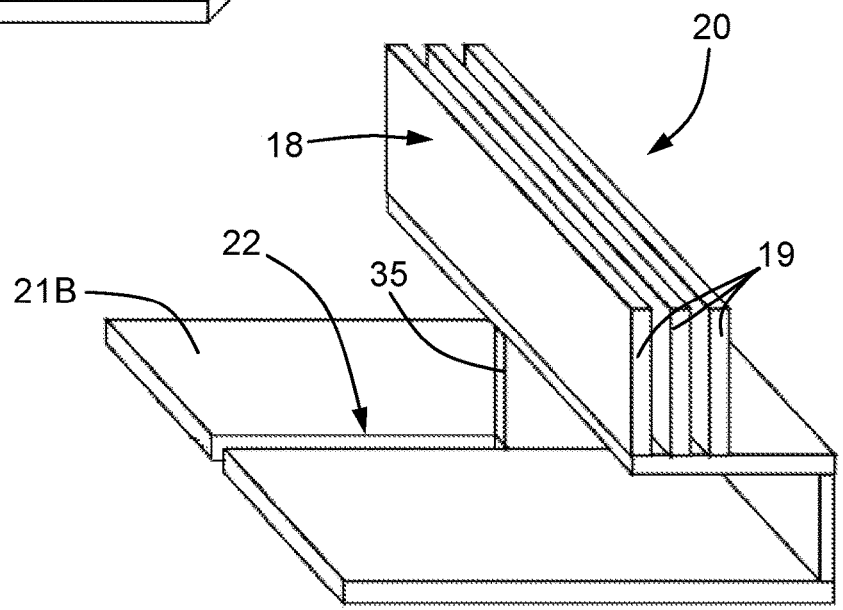
FIG. 18 is a perspective view of a further embodiment of a pedestal for holding one of the removable wall elements.

FIG. 17 and FIG. 18 show different perspective views of an embodiment of a pedestal 20 for holding one of the removable wall elements 12. As can be seen from the illustration in FIG. 1, the pedestals 20 can be accommodated in receptacle 4 and removed from receptacle 4 if necessary. Each pedestal 20 has either an non-slotted installation surface 21A (supporting surface) or a slotted installation surface 21B. Above installation surfaces 21A and 21B, pedestal 20 has formed the lateral guide 18 with which the removable wall elements 12 can be held when pedestal 20 is set up in the free space 100 (room). Lateral guide 18 comprises at least two spaced-apart guide elements 19. Pedestal 20 shown in FIG. 18 has a slot 22 for space-saving accommodation of the pedestals 20 (see FIG. 1). Pedestal 20 can receive the web 35 of the other pedestal 20 by means of slot 22.

Figure 19:
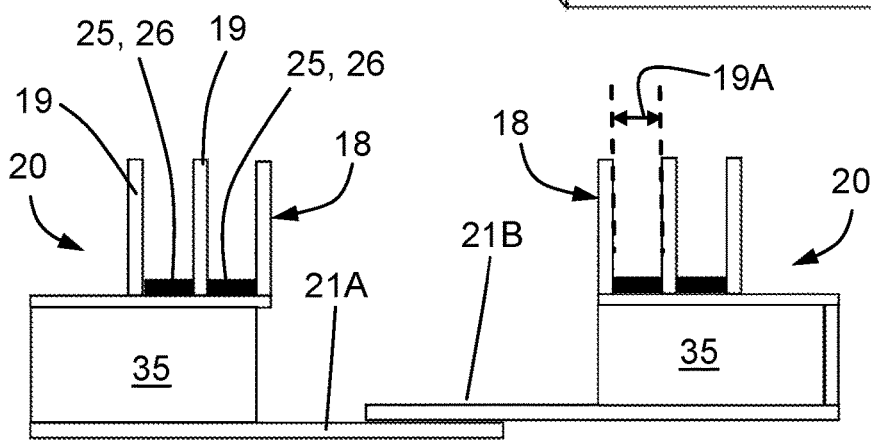
FIG. 19 shows schematically the arrangement of two pedestals with respect to one another, as can possibly be stored in the receptacle of the device.

FIG. 19 shows schematically the arrangement of two pedestals 20 with respect to one another and their configuration in order to store the pedestals 20 for the removable wall elements 12 in receptacle 4 of device 1 in the most space-saving manner possible. Here, an installation surface 21B of one of the pedestals 20 comes to rest over the installation surface 21A of the other pedestal 20. Slot 22 serves as a guide and position fixing of the pedestals 20 pushed into one another. At least one magnetizable element 25 or at least one magnet 26 is inserted between the guide elements 19 of the pedestals 20, which additionally magnetically fix the removable wall elements 12 in the pedestal 20. In order to facilitate the insertion of a removable wall element 12 into pedestal 20, a distance 19A between two guide elements 19 is greater than a thickness 12D (see FIG. 20) of the wall element 2 (or removable wall element 12).

Figure 20:
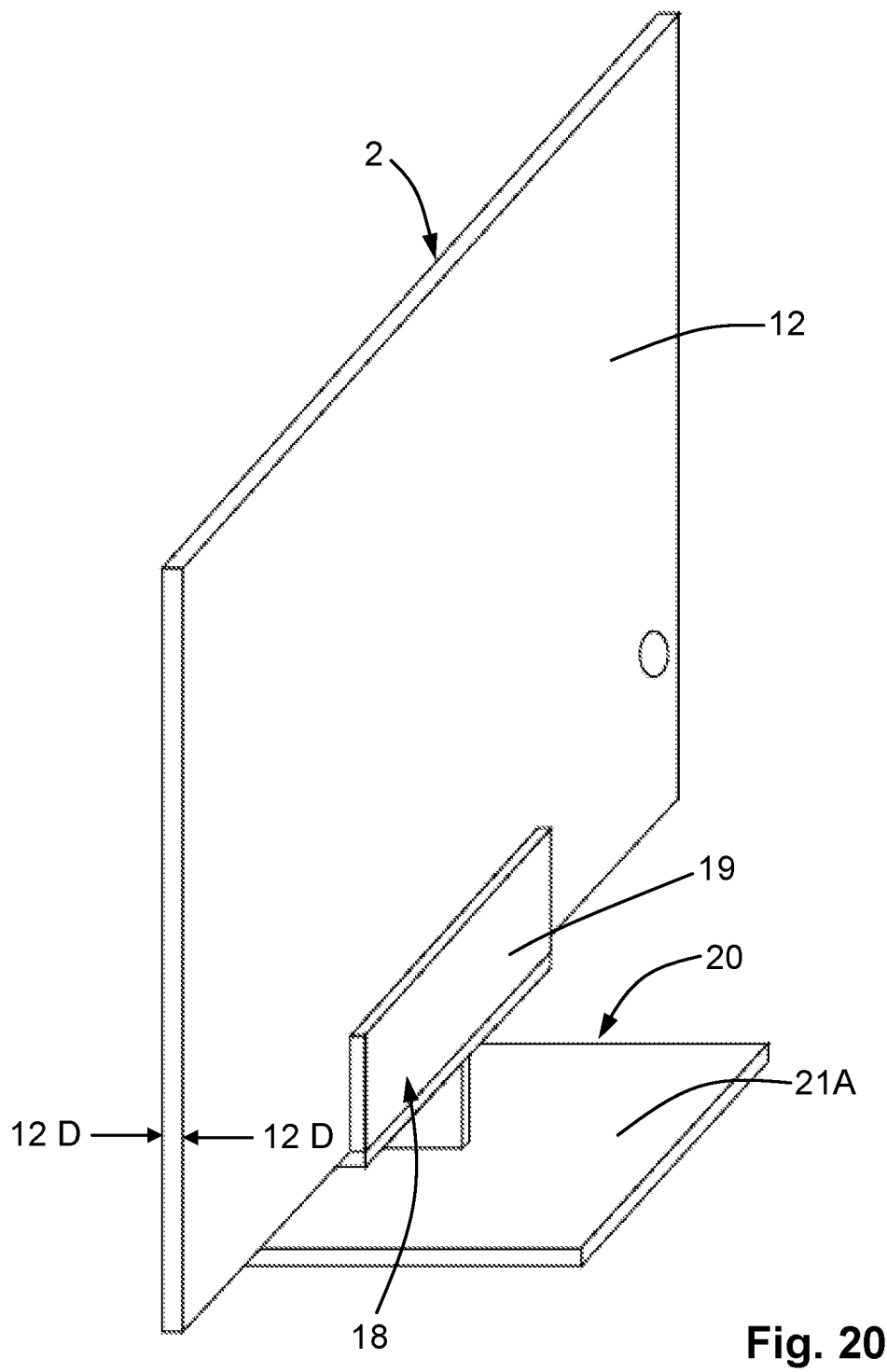
FIG. 20 is a perspective view of a wall element held in the pedestal.

FIG. 20 shows a perspective view of a pedestal 20 of the held wall element 2, which is configured as a removable wall element 12. With the installation surface 21A, the pedestal 20 can be set up on the bottom (not shown) of a space 100. The guide elements 19 of lateral guide 18 provide the required hold for the removable wall element 12, which hold can be ensured with the magnetizable elements 25 or the at least one magnet 26 described in FIG. 19.

Figure 21:
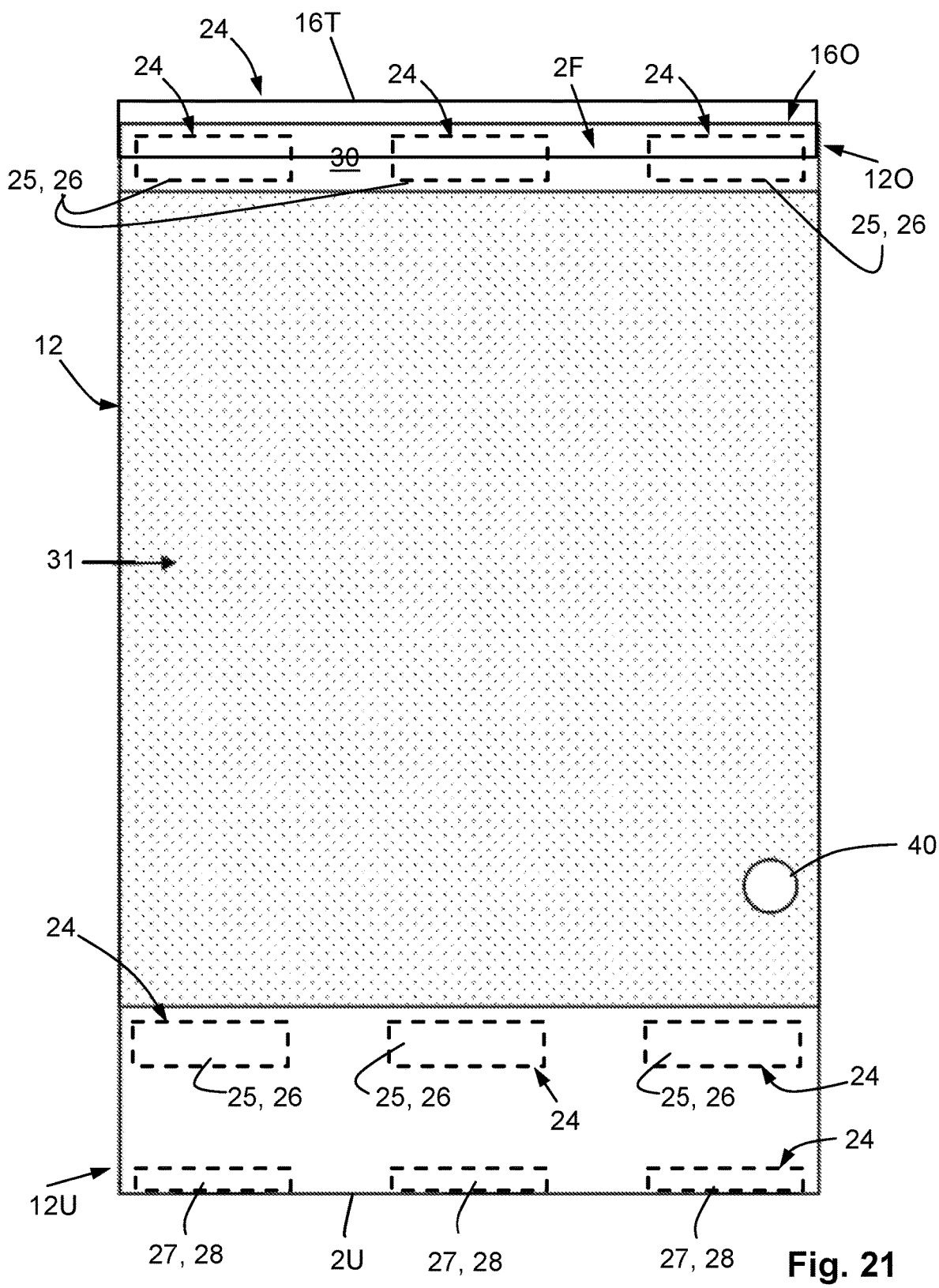
FIG. 21 is a plan view of a wall element with the fastening means arranged in or on the wall element.

FIG. 21 shows a plan view of a removable wall element 12 with the fastening means 24 arranged in or on removable wall element 12. In the embodiment shown here, the fastening means 24 at upper end 12O is a part 16T of linear guide 16 (see FIG. 5), which is located in the interior 9 of receptacle 4. Part 16T can be hung, for example, in the bar 29 on the outer surface 5A of side wall 5 of receptacle 4. The fastening means 24 can be of magnetic and/or mechanical nature. Although the following description is restricted to the magnetic properties of the fastening means 24, this should not be construed as a limitation of the invention. It is conceivable for a person skilled in the art that the fastening means 24 can comprise a combination of magnetic and mechanical fastening means 24, pure magnetic fastening means 24 or pure mechanical fastening means 24. In the case of pure magnetic fastening means 24, the fastening means 24 are in the form of at least one magnetizable element 25 or at least one magnet 26. Likewise, at least one corresponding magnetizable element 27 or magnet 28 is provided on a lower edge 2U of removable wall element 12. The at least one magnetizable element 27 or the at least one magnet 28 on the lower edge 2U of removable wall element 12 cooperates with the magnetizable element 25 or the at least one magnet 26 provided there to fix removable wall element 12 in pedestal 20. In addition to part 16T of linear guide 16 on wall element 12, the magnetizable elements 25 or the at least one magnet 26 can also be used as a support for fixing the removable wall element 12 on the outer surface 5A of side wall. For this purpose, at least one magnetizable element 25 or at least one magnet 26 is embedded in removable wall element 12, which interacts with at least one corresponding magnetizable element (not shown) or with at least one magnet (not shown) of side wall 5 of receptacle 4. The at least one magnetizable element 25 or the at least one magnet 26 can be provided in all wall elements 2 (pull-out wall elements 11 and removable wall elements 12). At least one surface 2F of the wall elements 2 is provided with a coating 30 which covers the at least one magnetizable element 25 or the at least one magnet 26 and which can be written on and wiped off. In the embodiment shown in FIG. 21, a magnetizable material 31 can also be applied to part of the surface 2F of wall element 2, to which movable magnets can adhere. Wall element 2 has formed the opening 40 required for the locking.

Figure 22:
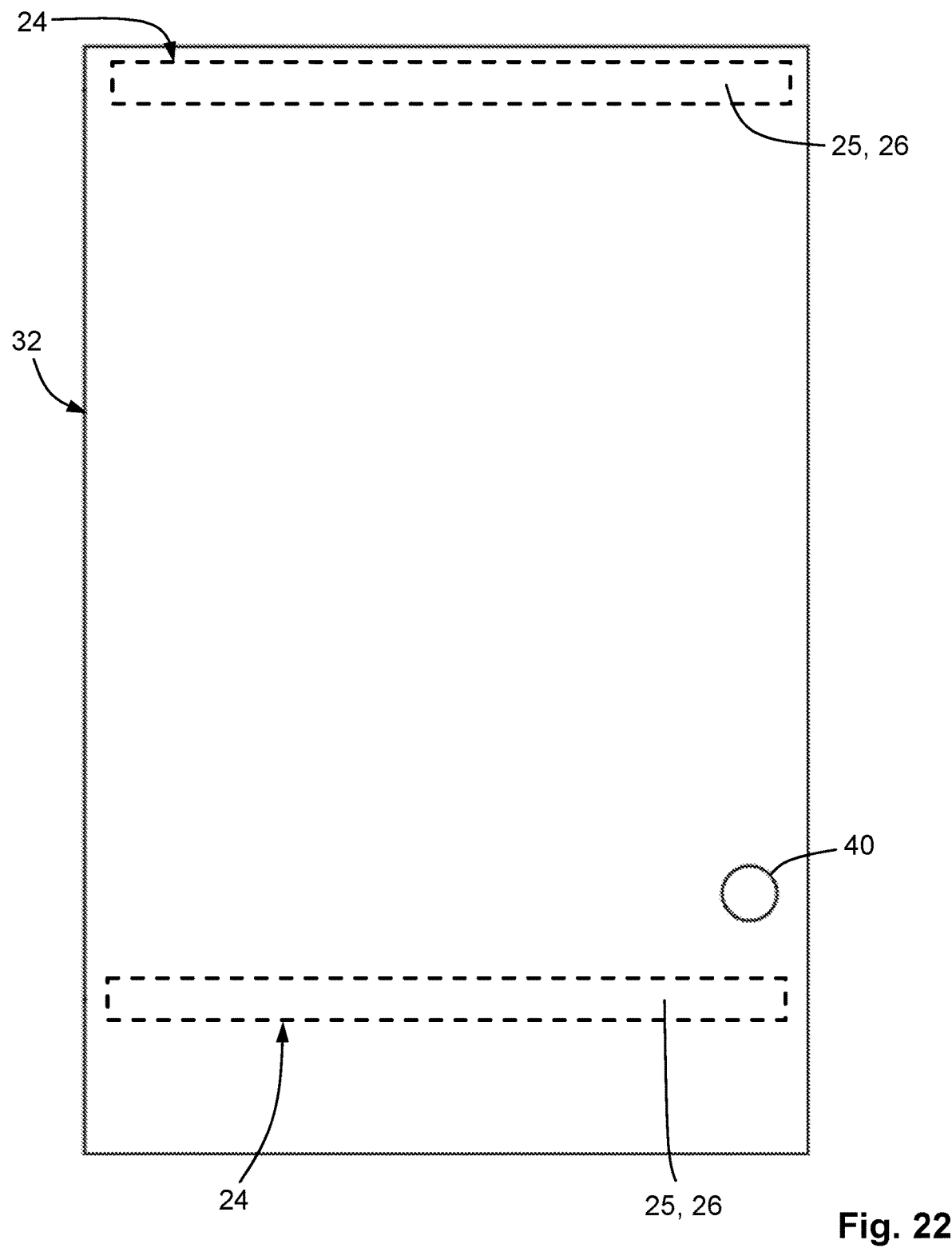
FIG. 22 is a plan view of a soft mat with the fastening means arranged in or on the soft mat for holding on the wall element.

FIG. 22 shows a plan view of a soft mat 32. In the embodiment shown here, fastening means 24 are provided in soft mat 32. The fastening means 24 are configured as magnetizable elements 25 or as magnets 26. To attach soft mat 32 to wall element 2 (pull-out wall element 11, removable wall element 12 or pivotable wall element 14) or to the outer surface 5A of side wall 5, corresponding magnetizable elements 25 or magnets 26 are provided in the wall element 2 or the side wall 5. Soft mat 32 also has an opening 40 which is aligned with an opening 40 of wall element 2 in order to enable the locking. As can be seen in FIG. 1, receptacle 4 has at least one compartment 13 in which the soft mats 32 can be stored.

Figure 23:
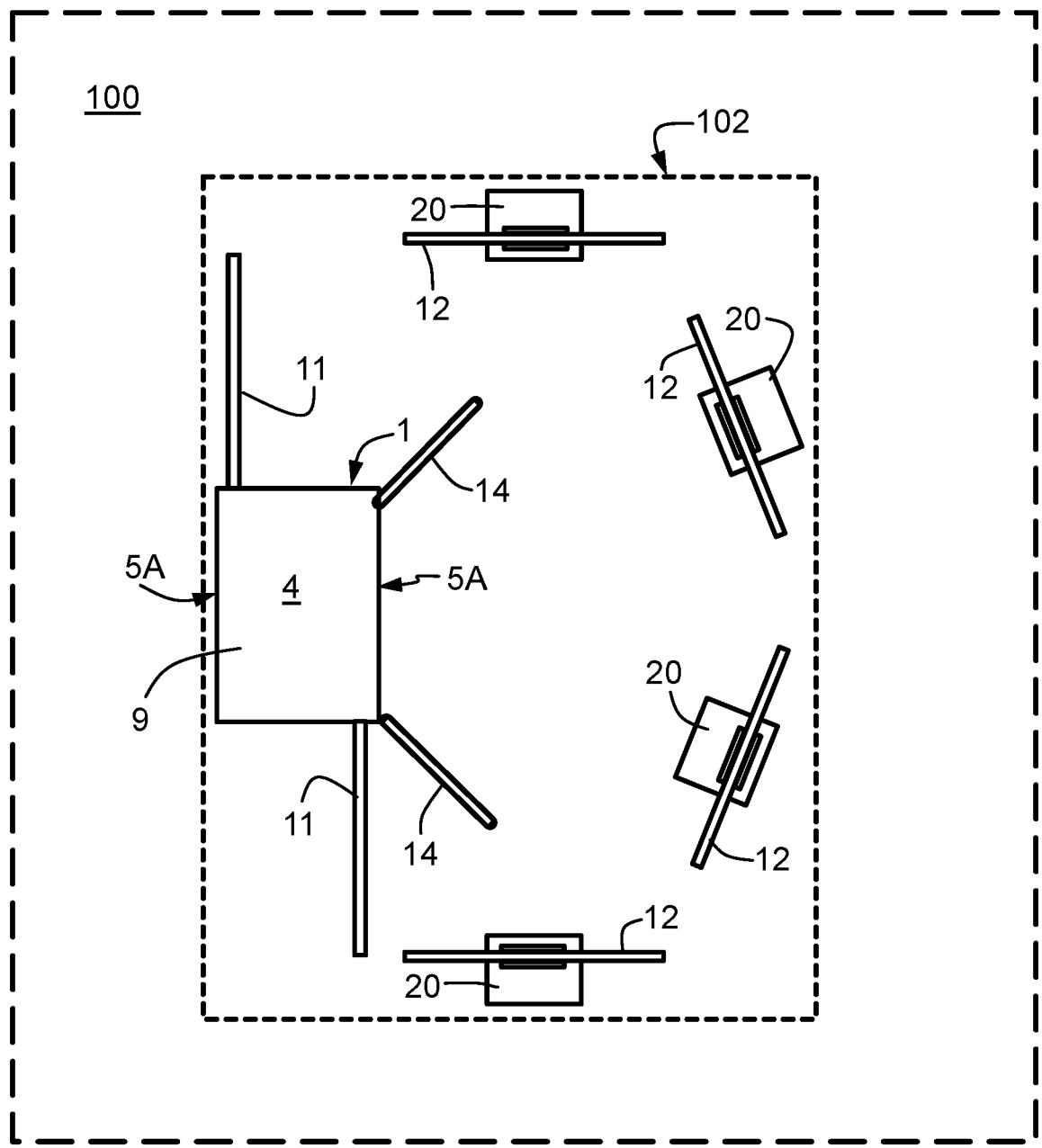
FIG. 23 is a schematic view of an embodiment of the delimitation of a sub-space with the device according to the invention; and, FIG. 24 is a schematic view of a further embodiment of the delimitation of a sub-space with the device according to the invention.

FIG. 23 shows a schematic view of an embodiment of the delimitation of a sub-space 102 (sub-room) with the device 1 according to the invention in the available space 100 (room). The device 1 shown here comprises two pull-out wall elements 11 and four removable wall elements 12. If also the two outer surfaces 5A are writable or usable, a total of fourteen writable or usable surfaces are available (without the pivotable wall elements 14). Each of the removable wall elements 12 is held in a pedestal 20, which can also be accommodated in receptacle 4 of device 1. If, as shown here, pivotable wall elements 14 are also provided, the number of writable or usable surfaces naturally increases.

Figure 24:
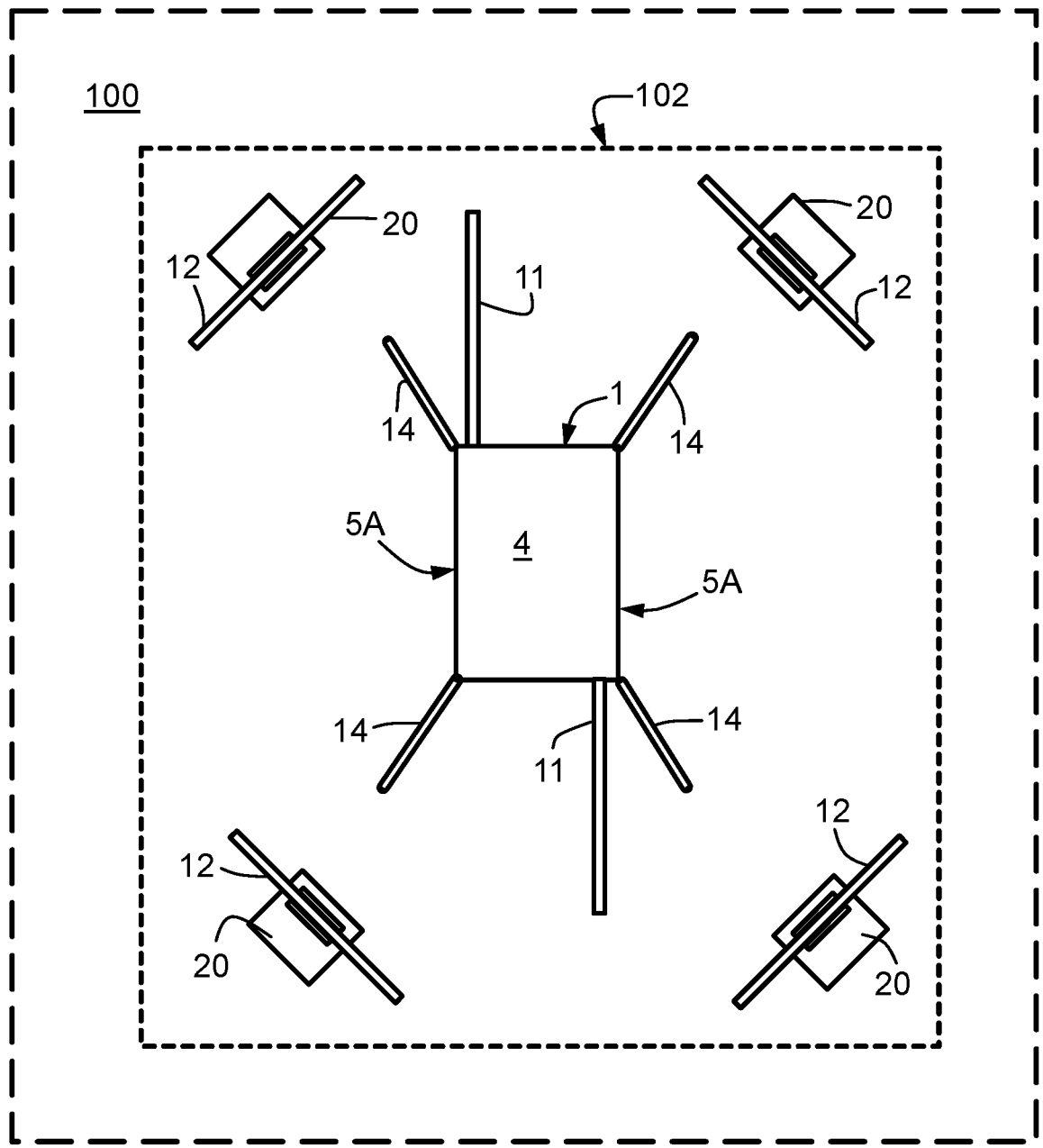

FIG. 24 shows a schematic view of a further embodiment of the delimitation of a sub-space 102 with device 1 according to the invention in the available space 100 (room). The equipment of device 1 corresponds to the equipment described in FIG. 23. In this arrangement, receptacle 4 with the pulled-out pull-out wall elements 11 is surrounded by the four pedestals 20, which each hold a removable wall element 12. In addition, four pivotable wall elements 14 are provided at receptacle 4 in this embodiment. The number of pivotable wall elements 14 provided at receptacle 4 should not be construed as a limitation of the invention.

The wall elements 2 present in receptacle 4 can be used as presentation walls or space (room) dividing elements. The wall elements 2 and the outer surfaces 5A of side walls 5 of receptacle 4 can be written on and wiped off. They can also be provided with a surface to which metallic objects and magnets adhere. In the side walls 5 of receptacle 4 in all wall elements 2, magnetizable elements 25 or magnets 26 are embedded below the surface, to which soft mats 32 can be attached, which have, for example, a magnetizable metal bar (strip). Objects can be attached or inserted into the soft mats 32 with needles.

LIST OF REFERENCE NUMERALS

1 Device
2 Wall element
2F Surface
2U Lower edge
4 Receptacle
4S End face
5 Side wall, side
5A Outer surface
6 Bottom, base
7 Ceiling
8 Transport rollers
9 Interior
10 Locking mechanism
11 Pull-out wall element
11O Upper end
11U Lower end
12 Removable wall element
12D Thickness
12O Upper end
12U Lower end
13 Compartment
14 Pivotable wall element
15 Pull-out element
16 Linear guide
16T Part of linear guide on wall element
17 Holder, bracket
18 Lateral guide
19 Guide elements
19A Distance
20 Pedestal, platform
21A slotless installation surface, supporting surface
21B slotted installation surface, supporting surface
22 Slot
23 Width
24 Fastening means
25 Magnetizable element
26 Magnet
27 Magnetizable element
28 Magnet
29 Bar, strip
30 Coating
31 Magnetizable material
32 Soft mat
35 Web, bridge
40 Opening
41 Stopper
42 Hinge
45 Support plate
50 Column
100 Space, room
102 Sub-space, sub-room
200 Construction element
b Width
h Height
L Longitudinal direction
t Depth
V Vertical axis

What is claimed is:

1. A device for storage and use of wall elements, comprising
a receptacle for a plurality of wall elements, said receptacle having side walls, wherein the wall elements are configured as pull-out wall elements or as removable wall elements or as pivotable wall elements, wherein the removable wall elements are held on an outer surface of the side walls of the receptacle with fastening means;
at least one construction element of the receptacle connects a bottom and a ceiling of the receptacle;

an opening in each wall element; and, a locking mechanism which interacts with the at least one construction element and is arranged to be inserted though aligned openings of the wall elements, thereby securing the wall elements in the receptacle against unauthorized removal.

2. The device according to claim 1, wherein the construction element is at least one side wall which connects and holds the bottom and the ceiling.

3. The device according to claim 1, wherein the construction element is at least one column which connects and holds the bottom and the ceiling.

4. The device according to claim 2, wherein each pull-out wall element has an upper end and a lower end and is held at least at its upper end and/or a lower end by means of at least one pull-out element extending in a longitudinal direction of the receptacle.

5. The device according to claim 4, wherein the at least one pull-out element extending in the longitudinal direction which defines a sliding guide or a roller-mounted guide.

6. The device according to claim 2, wherein the removable wall elements are hanging-guided at an upper end of a linear guide 16, which extends in the longitudinal direction of the receptacle.

7. The device according to claim 6, wherein the hanging-guided and removable wall elements are guided at a lower end of the wall elements in a lateral guide.

8. The device according to claim 2, wherein:
the removable wall elements are guided at their lower ends in a standing manner in a lateral guide arranged in the longitudinal direction of the receptacle, and,
the removable wall elements are freely guided at their upper ends in a guide element on the ceiling of the receptacle.

9. The device according to claim 8, wherein the lateral guide for the lower end of the removable wall element is provided directly on the bottom of the receptacle, on a support plate above the bottom of the receptacle or on a pedestal standing on the bottom of the receptacle.

10. The device according to claim 2, wherein the at least one pivotable wall element is configured to articulate at an end face of the receptacle by means of at least one hinge and to pivot about a vertical axis.

11. The device according to claim 1, wherein:
in an open state of the locking mechanism, one or more pull-out wall elements can be pulled-out parallel to the construction element of the receptacle in the longitudinal direction, and,
in a pulled-out state of the pull-out wall elements, the pull-out wall elements can be fixed to the receptacle, or,
in the pulled-out and a fixed state of the pull-out wall elements, the pull-out wall elements can be pivoted about a vertical axis.

12. The device according to claim 2, wherein in an open state of the locking mechanism, the removable wall elements can be removed parallel to the side walls of the receptacle from the receptacle whereupon one wall element can be held in a pedestal which can be removed from the receptacle.

13. The device according to claim 12, wherein the number of pedestals positioned on the bottom and removable from the bottom of the receptacle corresponds to the number of the removable wall elements provided in the receptacle.

14. The device according to claim 12, wherein each pedestal carries an installation surface and, above the installation surface, a lateral guide which comprises at least two spaced-apart guide elements, the distance of which is greater than a thickness of the wall element.

15. The device according to claim 14, wherein for fixing the position of the wall element in the pedestal in the lateral guide, at least one magnetizable element or at least one magnet is attached, which cooperates with at least one corresponding magnetizable element or magnet on a lower edge of the wall element.

16. The device according to claim 2, wherein the fastening means of the removable wall elements on the outer surface of the side walls is of magnetic and/or mechanical nature.

17. The device according to claim 1, wherein at least one surface of the wall elements carries a coating which can be written on and wiped off.

18. The device according to claim 1, wherein an outer surface of a side wall of the receptacle carries a coating which can be written on and wiped off.

19. The device according to claim 1, wherein a soft mat on at least one surface of the wall element and/or on at least one outer surface of a side wall of the receptacle can be mounted by means of mechanical and/or magnetic fastening means.

20. The device according to claim 19, wherein at least one compartment is provided in the receptacle in which the soft mats are stored.

21. The device according to claim 1, wherein a plurality of transport rollers is arranged on the bottom of the receptacle.

* * * * *